(12) United States Patent  
Grois et al.

(10) Patent No.: US 6,619,853 B2
(45) Date of Patent: Sep. 16, 2003

(54) OPTICAL FIBER INTERCONNECTION SYSTEM

(75) Inventors: Igor Grois, Northbrook, IL (US); Maurice X. Sun, Westmont, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/808,545

(22) Filed: Mar. 14, 2001

(65) Prior Publication Data

US 2002/0131719 A1 Sep. 19, 2002

(51) Int. Cl.⁷ .................................................. G02B 6/36
(52) U.S. Cl. ........................................................ 385/59
(58) Field of Search .......................... 385/59, 135, 134, 385/114, 55, 137, 136, 96, 98, 53

(56) References Cited

U.S. PATENT DOCUMENTS

| | | | | |
|---|---|---|---|---|
| 4,645,292 A | * | 2/1987 | Sammueller | 350/96.21 |
| 4,765,709 A | * | 8/1988 | Suillerot et al. | 350/96.2 |
| 4,885,839 A | * | 12/1989 | Ben-Dov | 29/60 |
| 5,206,927 A | * | 4/1993 | Finzel et al. | 385/135 |
| 5,212,761 A | * | 5/1993 | Petrunia | 385/135 |
| 5,394,495 A | * | 2/1995 | Booth et al. | 385/59 |
| 5,457,764 A | * | 10/1995 | Edera | 385/135 |
| 5,657,412 A | * | 8/1997 | Caudrelier | 385/135 |
| 6,116,789 A | * | 9/2000 | Mrakovich et al. | 385/59 |

* cited by examiner

*Primary Examiner*—Lynn Feild
*Assistant Examiner*—J. F. Duverne
(74) *Attorney, Agent, or Firm*—A. A. Tirva; Romi N. Bose

(57) ABSTRACT

An optical fiber interconnection system is provided, including a method of fabricating the system. A flat fiber optic circuit is provided with a flat substrate having a peripheral edge and a plurality of first optical fibers mounted on the flat substrate, with ends of the first fibers extending beyond the substrate. A fiber optic connector is terminated to a plurality of second optical fibers, with ends of the second fibers extending from the connector to a connecting point for connection to the ends of the first fibers from the flat fiber optic circuit. A protective shroud is installed over the connecting point between the ends of the first and second fibers. The protective shroud is fixed to the projecting tail portion of the substrate of the flat fiber optic circuit.

19 Claims, 2 Drawing Sheets

OPTICAL FIBER INTERCONNECTION SYSTEM

FIELD OF THE INVENTION

This invention generally relates to the art of optical fibers and, particularly, to an optical fiber interconnection system. Still further, this invention relates to an interconnection system for optical fibers between a flat fiber optic circuit and a fiber optic connector, along with a method of fabricating the system.

BACKGROUND OF THE INVENTION

Fiber optic circuitry is increasingly being used in electronics systems where circuit density is ever-increasing and is difficult to provide with known electrically wired circuitry. An optical fiber circuit is formed by a plurality of optical fibers carried by a dielectric or substrate and the ends of the fibers are interconnected to various forms of connectors or other optical transmission devices. A fiber optic circuit may include a simple cable which includes a plurality of the optical fibers surrounded by an outer cladding or tubular dielectric. On the other hand, a more sophisticated optical backplane or flat fiber optic circuit is formed by a plurality of optical fibers mounted or routed on a substrate in a given pattern or circuit geometry. Optical backplanes are used to interconnect optical circuit components which transmit signals optically, as well as electrical circuit components, wiring boards, modules and/or integrated circuits. When an optical backplane interconnects electrical components, the electrical energy of each component is translated to optical energy which is transmitted by optical fibers on the optical backplane to another electrical component where it is translated back to electrical energy for transmission to the other electrical component. Optical fibers can transmit much more information than electrical conductors and with significantly less signal degradation.

In fabricating flat fiber optic circuits or backplanes, the individual optical fibers often extend beyond an edge of the substrate whereby the individual fibers can be manipulated during termination of the fibers to various connectors or other fiber optic transmission devices. During termination, problems often are encountered. Specifically, whenever a fiber from the flat circuit is terminated to a connector, there is a possibility of the fiber breaking. The fibers also may be broken after termination to the connector(s) during handling and during polishing of the connector end face. If a single fiber on the circuit is broken, or if an unacceptable polishing process is performed on any one connector, the entire circuit and connectors must be discarded, resulting in a considerable loss of time and expenses.

The present invention is directed to solving these problems by providing a system which protects the fibers from breaking during assembly and during subsequent handling. The system also solves the problem of having to discard an entire circuit assembly should the polishing process on an individual connector be faulty.

SUMMARY OF THE INVENTION

An object, therefore, of the invention is to provide a new and improved optical fiber interconnection system.

Another object of the invention is to provide a new and improved interconnection system for fibers between a flat fiber optic circuit and a fiber optic connector.

A further object of the invention is to provide a method of fabricating the interconnection system.

In the exemplary embodiment of the invention, the interconnection system includes a flat fiber optic circuit having a flat substrate with a peripheral edge. A tail portion of the substrate projects from the peripheral edge to a distal end of the tail portion. A plurality of first optical fibers are mounted on the flat substrate and on the tail portion thereof. Ends of the first fibers extend beyond the distal end of the tail portion. A fiber optic connector is terminated, polished and tested to a plurality of second optical fibers. Ends of the second fibers extend from the connector to a connecting point for connection to the ends of the first fibers from the flat fiber optic circuit. A protective shroud is positioned over the connecting point between the ends of the first and second fibers. The protective shroud is fixed to the projecting tail portion of the substrate of the flat fiber optic circuit.

As disclosed herein, the protective shroud includes a rigid member extending at least from a point spaced inwardly of the distal end of the tail portion of the substrate to beyond the connecting point between the ends of the first and second fibers. The rigid member may be fabricated of glass. A plastic layer is positioned over the rigid member. The plastic layer is heat shrunk onto the rigid member, onto the distal end of the tail portion and onto the connected ends of the first and second fibers.

The invention contemplates that the substrate of the flat fiber optic circuit be a flat flexible substrate. Preferably, the ends of the first and second fibers are connected by a fused connection.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
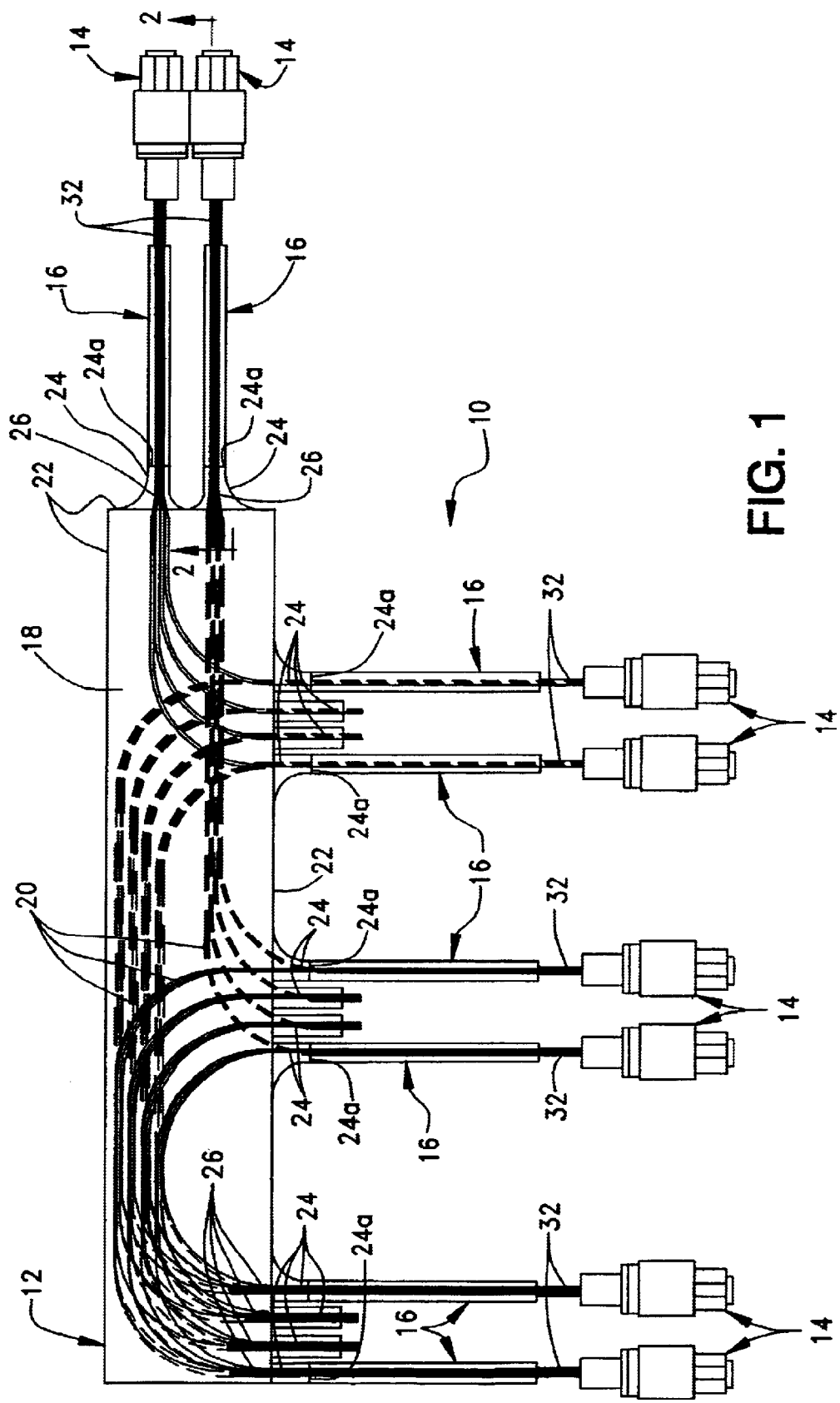
FIG. 1 is a plan view of an optical fiber interconnection system according to the concepts of the invention.

Referring to the drawings in greater detail, and first to FIG. 1, an optical fiber interconnection system, generally designated 10, is shown for interconnecting the optical fibers between a flat fiber optic circuit, generally designated 12, and a plurality of fiber optic connectors, generally designated 14. The interconnections are made within a plurality of protective shrouds, generally designated 16.

More particularly, flat fiber optic circuit 12 may be an optical backplane and includes a flat flexible substrate 18 having a plurality of optical fibers 20 routed thereon in a given circuit pattern. Substrate 18 defines a peripheral edge 22, and a plurality of tail portions 24 of the substrate project from edge 22 to distal ends 24a of the tail portions. Optical fibers 20 are routed on substrate 18 in groupings whereby the optical fibers exit the substrate and onto tail portions in multi-fiber ribbons 26.

Figure 2:
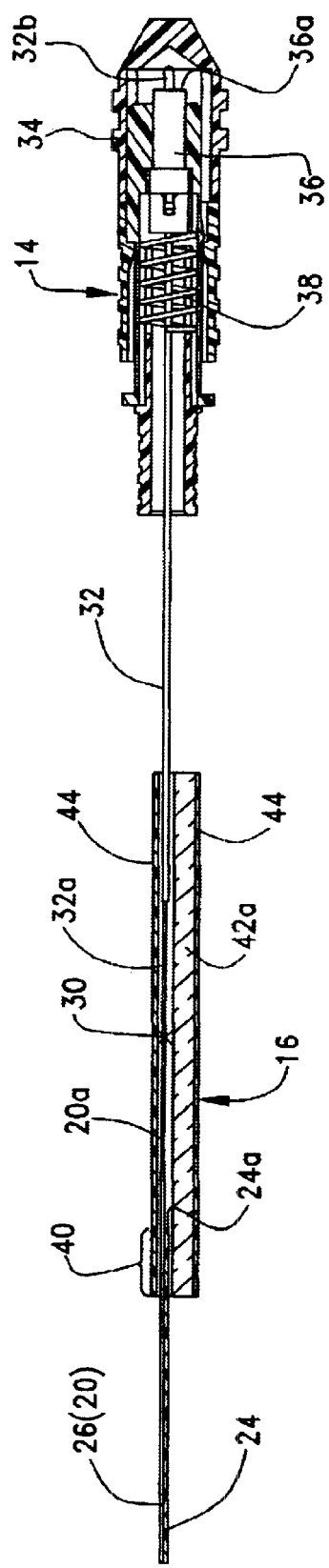
FIG. 2 is a section taken generally along line 2—2 of FIG. 1.

FIG. 2 shows a fiber ribbon 26 of multiple fibers 20 extending over one of the tail portions 24 of the substrate.

The fibers extend beyond distal end 24a of the tail portion. Actually, the fibers are "buffered" (i.e., surrounded by an insulation), and the fibers are stripped to expose bare fiber ends 20a which extend to a connecting point 30. For clarity purposes herein and in the claims hereof, fibers 20 from flat fiber optic circuit 12 will be called the "first" fibers.

With that understanding, and still referring to FIG. 2, a plurality of second optical fibers 32 in a ribbon configuration extend from one of the connectors 14 toward connecting point 30. Again, the fibers are buffered, and bare fiber ends 32a meet fiber ends 20a of the first fibers at connecting point 30 where the ends of the first and second optical fibers are fused together.

Fiber optic connectors 14 can take a wide variety of configurations and can be conventional fiber optic connectors or a wide variety of other connecting devices. In FIG. 2, connector 14 includes a protective end cover 34 which has been removed from the connectors in FIG. 1. Second optical fibers 32 extend into connector 14 and are terminated in a ferrule 36 as is known in the art. The ferrule is spring-loaded by a coil spring 38 which biases the ferrule in a forward or mating direction. Outer ends 32b of second fibers 32 are exposed at a front mating face 36a of the ferrule. As is known in the art, the fiber ends and/or the ferrule end face are highly polished to prevent losses when connector 14 is mated with a complementary mating fiber optic connector or other connecting device.

As stated in the "Background", above, the polishing processes on connector 14 as described immediately above, has created problems in assemblies where a plurality of connectors are interconnected to the fibers of a flat fiber optic circuit as shown in FIG. 1. If the polishing process is faulty or unacceptable, the entire system must be discarded. The present invention contemplates performing this polishing process after second fibers 32 are terminated to ferrule 36 of the individual connector, and then subsequently interconnecting second fibers 32 from the connector to first fibers 20 from the flat fiber optic circuit after the polishing process.

In addition, fiber breakage in systems of the prior art causes considerable problems and product waste. To that end, protective shrouds 16 basically provide support extensions from substrate 18 of flat circuit 12 all the way to and through connecting point 30 between first fibers 20 from the flat circuit and second fibers 32 from the connector.

More particularly, substrate 18 and tail portions 24 of the substrate provide a support for first optical fibers 20 to not only maintain the fibers in a given circuit pattern but prevent the fibers from breakage. For instance, the fibers may be adhered to the surface of the substrate, or a coating may be applied over the substrate including the pattern of fibers. In FIG. 2, it can be seen that protective shroud 16 extends inwardly beyond distal end 24a of tail portion 24 a distance indicated at 40. Therefore, protective shroud 16 forms an extension of supporting tail portion 24 to and through connecting point 30 of first and second fibers 20 and 32, respectively, and considerably over a length of the fiber ribbon of second fibers 32. Therefore, breakage of first fibers 20 from flat fiber optic circuit 12 to connecting point 30 is substantially eliminated.

Referring specifically to FIG. 2, each protective shroud 16 includes a rigid member 42 which may be fabricated of stiff glass material. The rigid member is sandwiched between a pair of plastic layers 44. Alternatively, layers 44 may be part of a tube-like protective sleeve completely surrounding rigid member 42 as well as fiber ends 20a and 32. The laminated layers or tube form a shroud means on the outside of shroud 16. Rigid member 42 and laminated layers or tube 44 extend inwardly beyond distal end 24a of tail portion 24 as indicated at 40. Plastic laminated layers or tube 44 preferably are fabricated of a heat shrinkable plastic material. In other words, when heat is applied to the plastic material, it shrinks and grips all of the interior components, thereby fixing rigid member 42 and the connected fiber ends to tail portion 24 of the fiber supporting substrate 18 of flat circuit 12. The heat shrinkable plastic material grips the interior components rather than adhering thereto. Therefore, the plastic laminates or tube can be cut-away to dismantle protective shroud 16 and gain access to connecting point 30 of the fibers should second fibers 32 become broken.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An optical fiber interconnection system, comprising:
    a flat fiber optic circuit including a flat substrate having a peripheral edge and a tail portion projecting from the peripheral edge to a distal end of the tail portion, and a plurality of first optical fibers mounted on the flat substrate and on the tail portion thereof, with ends of the first fibers extending beyond the distal end of the said tail portion;
    a fiber optic connector terminated to a plurality of second optical fibers, with ends of the second fibers extending from the connector to a connecting point for connection to the ends of the first fibers from the flat fiber optic circuit; and
    a protective shroud over the connecting point between the ends of the first and second fibers, the protective shroud being fixed to the projecting tail portion of the substrate of the flat fiber optic circuit.

2. The optical fiber interconnection system of claim 1 wherein said protective shroud includes a rigid member extending at least from a point spaced inwardly of the distal end of the tail portion of the substrate to beyond the connecting point between the ends of the first and second fibers.

3. The optical fiber interconnection system of claim 2 wherein said rigid member is fabricated of glass.

4. The optical fiber interconnection system of claim 2 wherein said protective shroud includes a plastic layer over said rigid member.

5. The optical fiber interconnection system of claim 4 wherein said plastic layer is heat shrunk onto the rigid member, onto the distal end of the tail portion and onto the connected ends of the first and second fibers.

6. The optical fiber interconnection system of claim 1 wherein the substrate of said flat fiber optic circuit comprises a flat flexible substrate.

7. The optical fiber interconnection system of claim 1 wherein the ends of the first and second fibers are connected by a fused connection.

8. An optical fiber interconnection system, comprising:
    a flat fiber optic circuit including a flat substrate having a peripheral edge and a tail portion projecting from the peripheral edge to a distal end of the tail portion, and a plurality of first optical fibers mounted on the flat substrate and on the tail portion thereof, with ends of the first fibers extending beyond the distal end of the said tail portion;

a fiber optic connector terminated to a plurality of second optical fibers, with ends of the second fibers extending from the connector to a connecting point for connection to the ends of the first fibers from the flat fiber optic circuit; and a protective shroud over the connecting point between the ends of the first and second fibers, the protective shroud including an inner rigid member extending at least from a point spaced inwardly of the distal end of the tail portion of the substrate to beyond the connecting point between the ends of the first and second fibers, and an outer plastic shroud means substantially surrounding the inner rigid member.

9. The optical fiber interconnection system of claim 8 wherein said rigid member is fabricated of glass.

10. The optical fiber interconnection system of claim 8 wherein said outer plastic shroud means is heat shrunk onto the rigid member, onto the distal end of the tail portion and onto the connected ends of the first and second fibers.

11. The optical fiber interconnection system of claim 8 wherein the substrate of said flat fiber optic circuit comprises a flat flexible substrate.

12. The optical fiber interconnection system of claim 8 wherein the ends of the first and second fibers are connected by a fused connection.

13. An optical fiber interconnection system, comprising:

a flat fiber optic circuit including a flat substrate having a peripheral edge and a plurality of first optical fibers mounted on the flat substrate with ends of the first fibers extending beyond said peripheral edge;

a fiber optic connector terminated to a plurality of second optical fibers, with ends of the second fibers extending from the connector to a connecting point for connection to the ends of the first fibers from the flat fiber optic circuit; and a protective shroud over the connecting point between the ends of the first and second fibers, the protective shroud being fixed to the substrate of the flat fiber optic circuit.

14. The optical fiber interconnection system of claim 13 wherein said protective shroud includes a rigid member extending from the substrate to beyond the connecting point between the ends of the first and second fibers.

15. The optical fiber interconnection system of claim 14 wherein said rigid member is fabricated of glass.

16. The optical fiber interconnection system of claim 14 wherein said protective shroud includes a plastic layer over said rigid member.

17. The optical fiber interconnection system of claim 16 wherein said plastic layer is heat shrunk onto the rigid member, onto the distal end of the tail portion and onto the connected ends of the first and second fibers.

18. The optical fiber interconnection system of claim 13 wherein the substrate of said flat fiber optic circuit comprises a flat flexible substrate.

19. The optical fiber interconnection system of claim 13 wherein the ends of the first and second fibers are connected by a fused connection.

* * * * *